No. 797,914. PATENTED AUG. 22, 1905.
H. ROCHAT.
SPLIT SLEEVE FOR GAS, WATER, OR OTHER PIPES.
APPLICATION FILED FEB. 20, 1905.
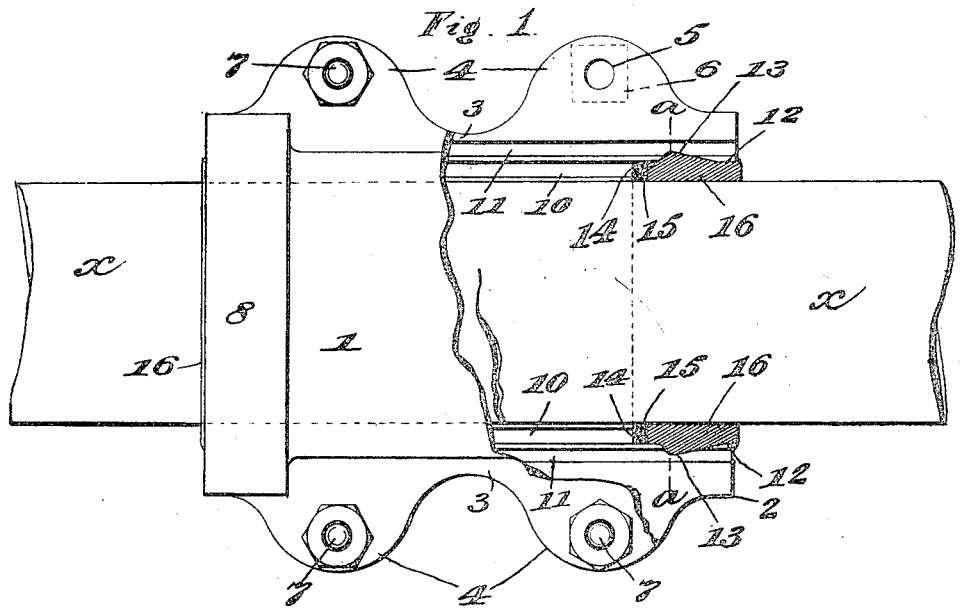
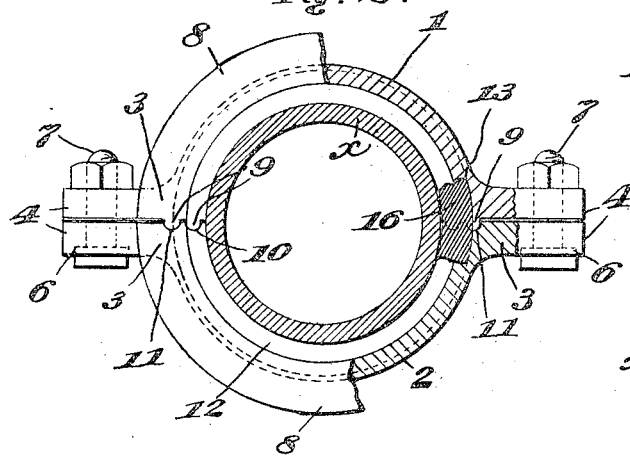
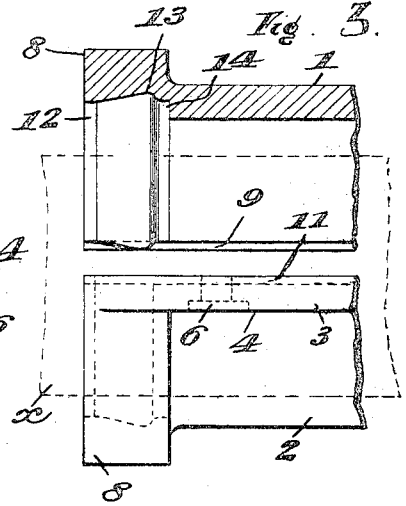
Witnesses
L. W. Jones
Arthur Kline
Inventor
Henry Rochat,
by John Elias Jones,
his attorney.

UNITED STATES PATENT OFFICE.

HENRY ROCHAT, OF CINCINNATI, OHIO.

SPLIT SLEEVE FOR GAS, WATER, OR OTHER PIPES.

No. 797,914.      Specification of Letters Patent.      Patented Aug. 22, 1905.

Application filed February 20, 1905. Serial No. 246,474.

*To all whom it may concern:*

Be it known that I, HENRY ROCHAT, a citizen of the United States of America, and a resident of Cincinnati, in the county of Hamilton and State of Ohio, have invented certain new and useful Improvements in Split Sleeves for Gas, Water, or other Pipes, of which the following is a specification.

This invention relates to certain improvements in that class of pipe-couplings which are especially designed for application as sleeves to gas-mains and other pipes for stopping leaks therein; and the object of the invention is to provide a device of this general character of a simple and inexpensive nature and of a compact, strong, and durable construction which shall be capable of ready and convenient application for securely closing the leaks in pipes, being formed in sections with reciprocal engaging devices, whereby when the sections are applied to the pipe and connected a close joint will be provided between them to prevent the escape of fluid.

The invention consists in certain novel features of the construction, combination, and arrangement of the several parts of the improved pipe-coupling whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a broken plan view showing part of a pipe provided with a coupling or sleeve constructed according to my invention and applied for closing a leak in the pipe. Fig. 2 is a sectional view taken transversely through the pipe seen in Fig. 1, a part of the improved pipe coupling or sleeve being shown in end elevation and a part thereof being shown in section in the plane indicated by the line *a a* in Fig. 1. Fig. 3 is a view showing end portions of the sections of the pipe coupling or sleeve, one of the same being in elevation and the other in central section. Fig. 4 is a perspective view showing a sectional fragment of one of the coupling sleeves or members.

As shown in these views, the improved pipe coupling or sleeve comprises two parts or halves 1 and 2 of semicircular form in cross-section and adapted to be fitted upon opposite sides of the pipe or main *x* in position to cover the break or crack therein, as indicated in Figs. 1 and 2. The parts or halves 1 and 2 are provided at opposite sides with outwardly-extended webs or flanges 3, having adjacent to opposite ends of the coupling projecting lugs or ears 4, perforated, as shown at 5, for the passage of bolts 7, by means of which the two parts or halves of the coupling-sleeve are securely held in relation upon the pipe or main. The ears or lugs 4 of one-half or part of the coupling, for example, are provided with squared recesses 6, as shown in dotted lines, adapted to receive the squared ends of the bolts 7 in a well-known way.

The parts or halves 1 and 2 of the improved coupling-sleeve are provided at opposite ends with semicircular members or enlargements 8, adapted when the parts or halves are in relation to correspond with each other to produce an annular enlargement at each end of the coupling-sleeve, and upon the flattened surfaces of the webs or flanges 3 3, at opposite sides of one of the halves or members of the improved coupling—as, for example, member 1—are provided with parallel beads or ribs 9 9, extended lengthwise along said member and adapted to engage, respectively, in grooves or chambers 10 and 11, arranged in pairs upon the opposite webs or flanges 3 3 of the other half or member 2 of the coupling.

The ribs or beads 9 9 on the webs or flanges of the member 1 are, as herein shown, of semicircular cross-section and their reciprocal grooves or channels 10 and 11 at opposite sides of the coupling member 2 are correspondingly formed, so that when the halves or members 1 and 2 are in relation, as shown in Fig. 2 of the drawings, the said ribs or beads 9 9 will fit snugly in the semicircular grooves or channels provided in member 2 to receive them, whereby a tight joint is afforded between the webs or flanges of the members to prevent leakage of gas or other fluid between the members of the coupling.

The arrangement of the beads or ribs and their reciprocal grooves or channels is such that a pair of said beads 9 9 and of their reciprocal channels or grooves 10 and 11 are arranged at each side of the improved coupling, and at the ends of the coupling formed of the members 1 and 2 there are provided annular recesses or chambers 12, extended in circular form within the heads or enlargements 8, one-half of each such recess or chamber 12 being produced in each half or member of the coupling.

The inner grooves or channels 10 10 and their reciprocal inner beads 9 9 at opposite sides of the coupling members and which when the parts are in relation are adjacent to the pipe or main $x$ are of less length than the outer beads 9 9 and their reciprocal grooves or channels 11 11 in the coupling members, said outer beads 9 and channels 11 being extended along the entire lengths of the respective members, while the inner beads 9 and channels 10 are of less length, being only extended between the annular chambers or recesses 12 12 at opposite ends of the coupling.

Each chamber or recess 12 is provided at its inner end and adjacent to the ends of the shorter inner beads and grooves 9 and 10 of the coupling members with a cylindric portion 14, in which is adapted to be received a packing of hemp yarn or other suitable fibrous material, as shown at 15, said packing being tamped or calked tightly in position within said cylindric portion of the recess, and adjacent to said cylindric portion 14 each chamber or recess has an expanded portion 13, which is located at about the center of the chamber or recess and is made in greater diameter than either the cylindric portion 14 at the inner end of the chamber or the outer portion of the said chamber or recess, which outer portion is also made cylindric in form.

The walls of the central enlarged portion 13 of each chamber or recess 12 are made gradually flaring or tapering outward from the smaller cylindric outer portion of the recess or chamber toward the inner end thereof, and in each chamber or recess 12, constructed as above described, is adapted to be received a filling of lead or other readily-fusible metal, which is poured into the recess to completely fill the same outside of the packing 15 of hemp yarn, the formation of each chamber or recess, with its enlarged tapered central portion, being such as to securely hold said lead or other filling 16 in position in the chamber or recess, so as to effectively seal the end of the coupling against the escape of gas or other fluid.

In the operation of the improved coupling it will be evident that the inner and outer beads and grooves 9, 10, and 11 at the opposite sides of the device afford an effective seal to prevent leakage of fluid laterally between the members, while the packings and fillings 15 and 16 in the recesses 12 at the ends of the coupling effectively prevent leakage of gas between the pipe or main and the coupling-sleeve, the ends of the inner grooves and beads 9 and 10 at opposite sides of the members being sealed by said packings and fillings. The outer beads and grooves 9 and 11 form an auxiliary seal extended lengthwise of the members outside of the inner beads and grooves 9 and 10, and said outer auxiliary beads and grooves being extended the full lengths of the coupling members are also engaged by the outwardly-directed central portions of the fillings 16 within the central enlargements 13 of the chambers or recesses 12 at the ends of the coupling, so that escape of fluid at the ends of said grooves and beads 9 and 11 is also prevented.

From the above description it will be apparent that the improved coupling-sleeve constructed according to my invention is of an extremely simple and inexpensive nature and is especially well adapted for use by reason of the readiness with which it may be applied to gas and other mains for stopping leaks when permanent repairs are not practicable, and it will also be obvious from the above description that the improved coupling-sleeve is capable of some modification without material departure from the principles and spirit of the invention, and for this reason I do not wish to be understood as limiting myself to the precise form and arrangement of the several parts of the device herein set forth in carrying out my invention in practice.

Having thus described my invention, what I claim, and desire to secure by Letters Patent, is—

1. A device of the character described comprising coupling or sleeve members having semicylindrical parts the opposite sides or flanges of which are provided with pairs of parallel, unbent, longitudinal reciprocal beads and grooves and the ends of which are provided with tapering annular chambers or recesses at the inner ends of which said parallel, straight, reciprocal beads and grooves terminate, the inner cylindric portions of said chambers or recesses being formed with an enlarged annulus to receive a lead or other filling to close the joints at the ends of the coupling.

2. A device of the character described comprising semicylindrical members having lateral flanges provided with apertured ears for the reception of bolts, the ends of the members having annular enlargements, in which are produced annular chambers or recesses adapted to receive a lead or other filling and having central enlarged portions the opposite sides of the respective members being provided with short reciprocal grooves and beads extended between the inner ends of the respective chambers or recesses and being also provided with outer reciprocal grooves and beads extended along the entire lengths of the members outside of said annular recesses or chambers at the ends thereof, the enlarged central portions of said recesses or chambers being extended outwardly into said outer longer grooves and beads.

Signed at Cincinnati, Ohio, this 16th day of February, 1905.

HENRY ROCHAT.

Witnesses:
JOHN ELIAS JONES,
ARTHUR KLINE.